(12) United States Patent
Lambert (10) Patent No.: US 7,195,440 B2
(45) Date of Patent: Mar. 27, 2007

(54) AGRICULTURAL SILO AUGER SYSTEM APPARATUS AND METHOD

(76) Inventor: Charles F. Lambert, 4407 W. Highway 42, Goshen, KY (US) 40026

( * ) Notice: Subject to any disclaimer, the term of this patent is extended or adjusted under 35 U.S.C. 154(b) by 415 days.

(21) Appl. No.: 10/854,230

(22) Filed: May 27, 2004

(65) Prior Publication Data

US 2006/0018739 A1   Jan. 26, 2006

(51) Int. Cl.
*B65G 65/46* (2006.01)
(52) U.S. Cl. ..................... 414/320; 414/808
(58) Field of Classification Search ................ 414/133, 414/326, 808, 320, 317; 406/59
See application file for complete search history.

(56) References Cited

U.S. PATENT DOCUMENTS

| | | | | |
|---|---|---|---|---|
| 1,570,085 A | * | 1/1926 | Saxe | 414/310 |
| 2,869,743 A | * | 1/1959 | Williams | 198/530 |
| 3,557,979 A | * | 1/1971 | Zortman | 414/287 |
| 3,602,380 A | * | 8/1971 | Spencer | 414/326 |
| 3,785,512 A | * | 1/1974 | Gatz et al. | 414/326 |
| 3,794,190 A | * | 2/1974 | Lambert, Jr. | 414/295 |
| 4,484,606 A | * | 11/1984 | Kosters | 141/114 |
| 4,875,820 A | * | 10/1989 | Lepp et al. | 414/306 |
| 5,642,977 A | * | 7/1997 | Hanson et al. | 414/320 |
| 6,099,205 A | * | 8/2000 | Macku et al. | 404/92 |
| 6,203,261 B1 | * | 3/2001 | South et al. | 414/317 |
| 6,808,354 B1 | * | 10/2004 | Kulbeth | 414/326 |

* cited by examiner

*Primary Examiner*—Charles A. Fox
(74) *Attorney, Agent, or Firm*—Berenato, White & Stavish (57) ABSTRACT

An auger assembly that has three individual augers that function cooperatively to transport silage within a silo. Specifically, the auger assembly is used to manipulate silage during the loading and unloading of a silo. The first and third augers have the same flighting and rotate in the same direction. The second auger is positioned between the first and third augers and rotates in the opposite direction and has flighting that is the opposite of the flighting of the first and third augers. The individual augers rotate so that silage is moved along parallel with the longitudinal axes of the augers. The design of the auger assembly allows the assembly to transition from a loading to an unloading configuration by electronically reversing the direction of rotation of the individual augers without mechanically altering the auger assembly configuration.

18 Claims, 6 Drawing Sheets

AGRICULTURAL SILO AUGER SYSTEM APPARATUS AND METHOD

FIELD OF THE INVENTION

The present invention relates to a multiple auger method and apparatus and method for transporting and redistributing silage within a silo.

BACKGROUND OF THE INVENTION

Systems for transporting and redistributing silage within a silo typically include an auger assembly extending horizontally from the center of the silo to the inner wall of the silo. As silage is directed into the center of the silo during the loading process, axial rotation of the individual auger(s) transports the silage outward from the center of the silo toward the wall of the silo. The auger assembly also rotates about the center of the silo and "sweeps" an essentially horizontal cross section of the silo in a clock hand-type manner. The combination of the rotation of the individual auger(s) and the sweeping action of the auger assembly moves the silage radially outward and ensures that the silage filling the silo is evenly distributed across a cross section of the silo.

The auger systems also work during the silo unloading process. The direction of rotation of the individual auger(s) is reversed so that silage is moved radially inwardly from the outer areas of the silo toward the silo center. During the unloading process, the auger assembly is also moved in a sweeping action as described above. Through the rotary action of the individual auger(s) and the sweeping movement of the auger assembly, silage is transported radially inward from the outer areas of the silo to a hole in the center of the stored silage. The transported silage is then directed downwardly through the center hole and down to a conveyor belt or discharge apparatus at the base of the silo. The discharge apparatus discharges the silage from the silo.

The prior art includes auger assemblies having single and double auger configurations. The single auger configuration is the simplest and it allows an operator to go from a silo loading configuration to an unloading configuration by simply flipping a switch to reverse the direction of auger rotation. However, a single auger system requires the use of a relatively large diameter auger. To be effective, the large diameter auger must be rotated relatively slowly and functions by moving the transported silage underneath the auger. Although the single auger configuration has important advantages, it is also relatively slow and inefficient.

Conventional dual auger assemblies allow the use of smaller diameter augers that can be rotated at an increased speed relative to the single auger configuration. In a dual auger assembly, the two augers have opposite flighting and rotate in opposite directions. Silage is lifted upwardly by rotation of the augers and carried in the direction dictated by the auger flighting. While a conventional dual auger system is faster and more efficient than a single auger system, the dual auger system cannot be easily changed from a loading to an unloading configuration. Changing a conventional dual auger configuration from a loading to an unloading configuration requires an operator to physically enter the silo and manually reverse the positions of the augers. The process of reversing the augers involves manually manipulating heavy machinery and is inconvenient, time consuming, and difficult.

The need exists for an auger assembly that can transport silage quickly and efficiently while having the ability to go from a loading configuration to an unloading configuration without going through an arduous reversal process. The present invention provides a three-auger system that transports silage more quickly than a dual auger system, while also having the advantage of allowing an operator to switch from a loading configuration to an unloading configuration by simply flipping a switch.

SUMMARY OF THE INVENTION

The present invention is an auger assembly used to transport silage within a silo during the loading and unloading processes. The assembly is comprised of three individual augers that cooperate to transport silage within the silo. The first and third or outer augers have the same flighting and rotate in the same direction. The second auger or inner auger is positioned between the first and third augers and rotates in the opposite direction and has flighting that is the opposite of the flighting of the first and third augers. The individual augers rotate so that silage is moved parallel to the longitudinal axes of the augers. The auger assembly also sweeps an essentially horizontal cross section of the silo. During a loading operation, silage is moved outwardly from center of the silo toward the inner wall of the silo. During an unloading operation, silage is moved inwardly to a discharge assembly in communication with a hole in the center of the stored silage. The auger assembly allows the assembly to transition from a loading to an unloading configuration by simply electronically reversing the direction of rotation of the individual augers without mechanically altering the auger assembly configuration.

DETAILED DESCRIPTION OF PREFERRED EMBODIMENTS

Figure 1:
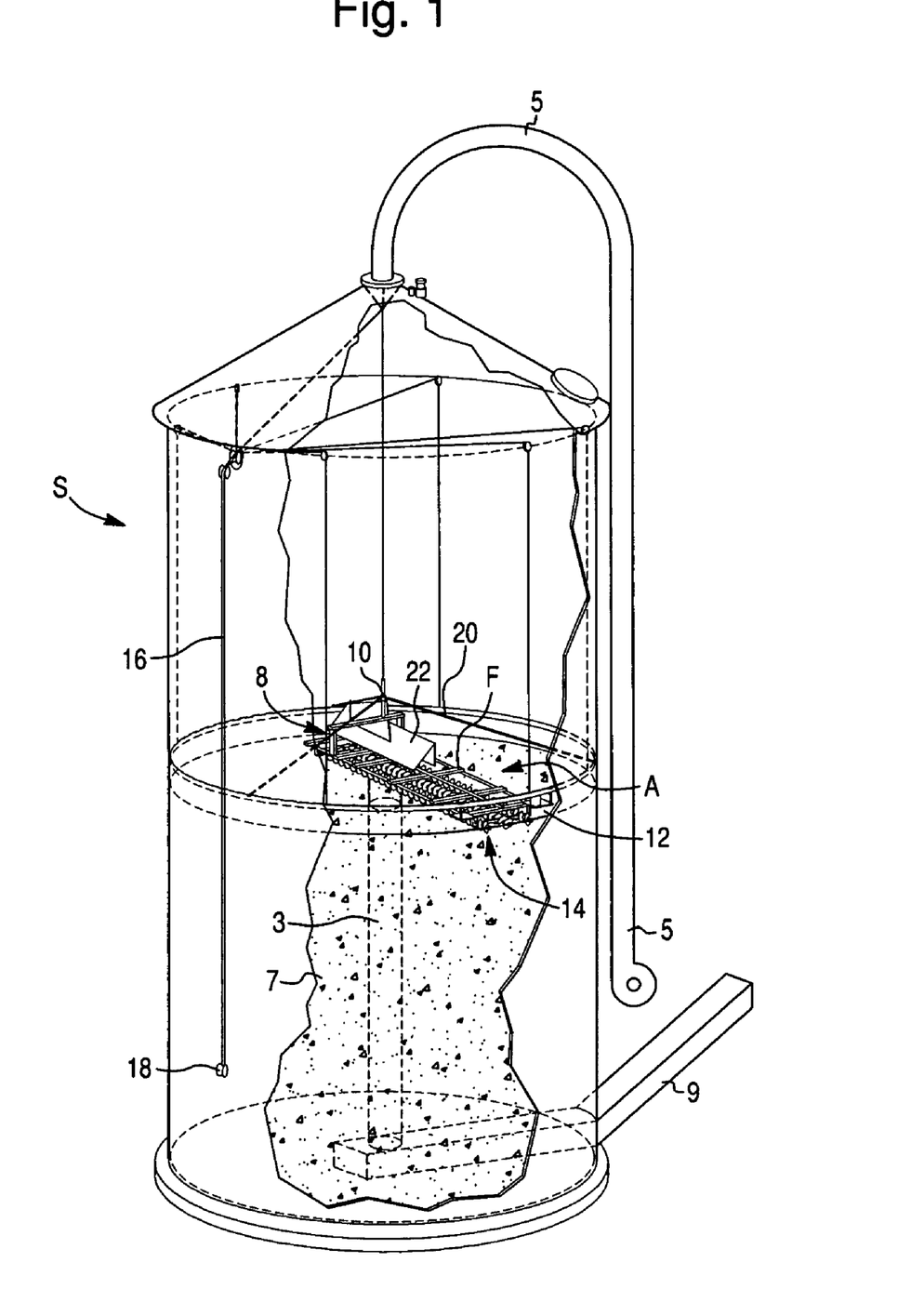
FIG. 1 is a perspective view with portions of the silo broken away showing the auger assembly of the present invention suspended within the silo.

FIG. 1 illustrates the auger assembly A of the present invention suspended within a silo, preferably a top-loading silo S. The auger assembly A generally includes a plurality of individual augers, preferably three augers, supported within a frame assembly F. A support cable system extends along the exterior of the silo S upwardly through a suspensions system and down into the silo S. The suspension system is comprised of pulleys and cable manipulation and support mechanisms that direct support cables downwardly toward the auger assembly A. The suspension system and the support cable systems are both well known in the art. Support cables attach to a stem assembly 10 to support a first end 8 of the auger assembly A. Support cables also attach to a ring assembly 12, which supports a second end 14 of the auger assembly A. A spider frame assembly 20 maintains the stem assembly 10 centered within the silo S.

Figure 4:
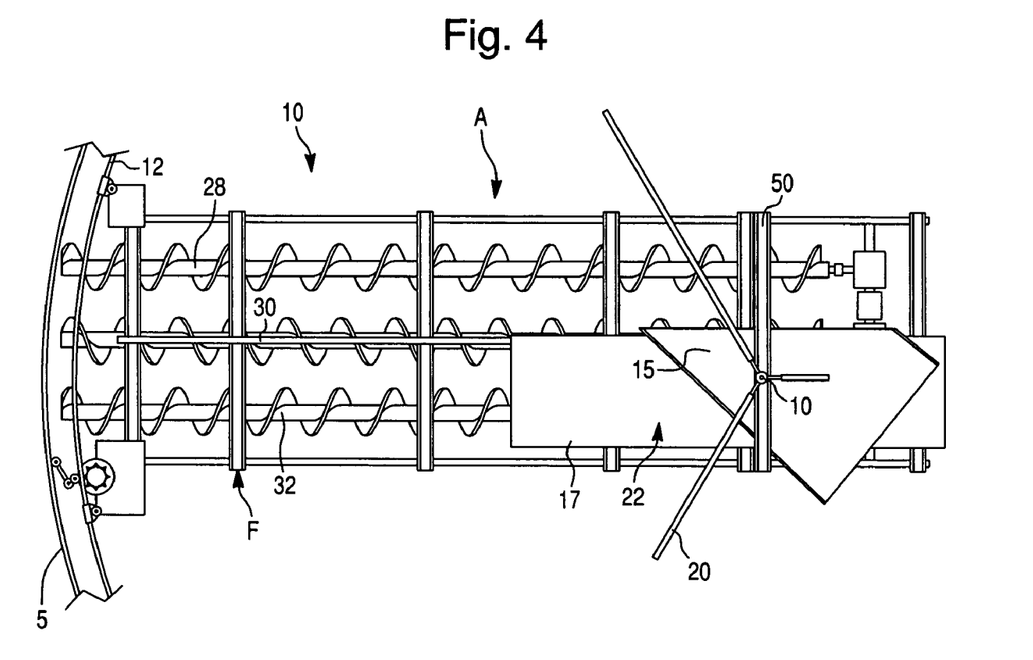
FIG. 4 is a fragmentary top plan view of FIG. 1 showing the diverter assembly.

During silo loading and unloading operations, a winch 18 positioned on the exterior of the silo S cooperates with the cable support system and raises and lowers the auger assembly A. During loading operations, a diverter assembly 22, as best shown in FIG. 4, directs incoming silage to an area between two of the three augers.

Figure 2:
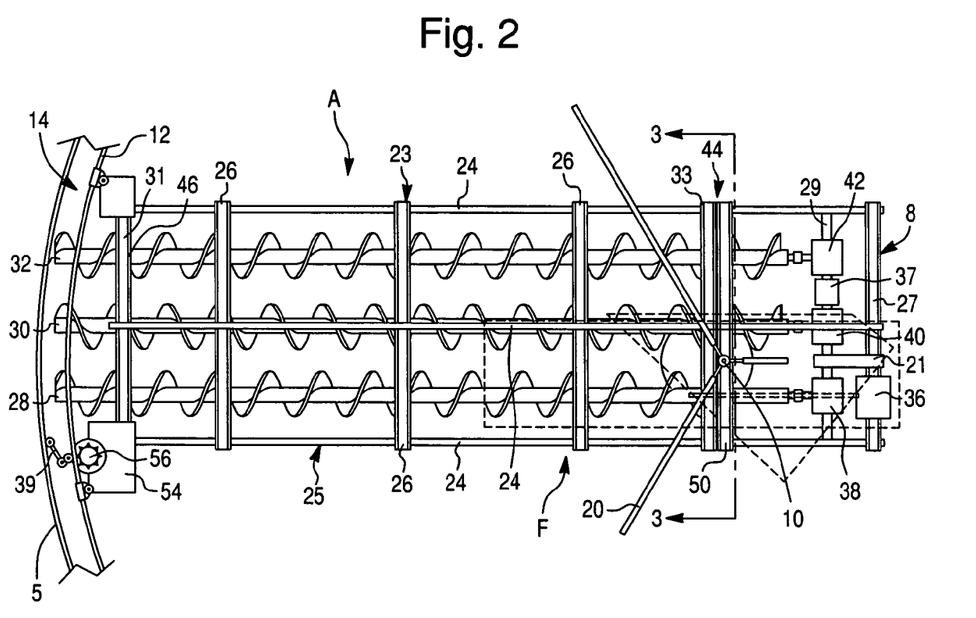
FIG. 2 is a fragmentary top plan view of FIG. 1.
Figure 3:
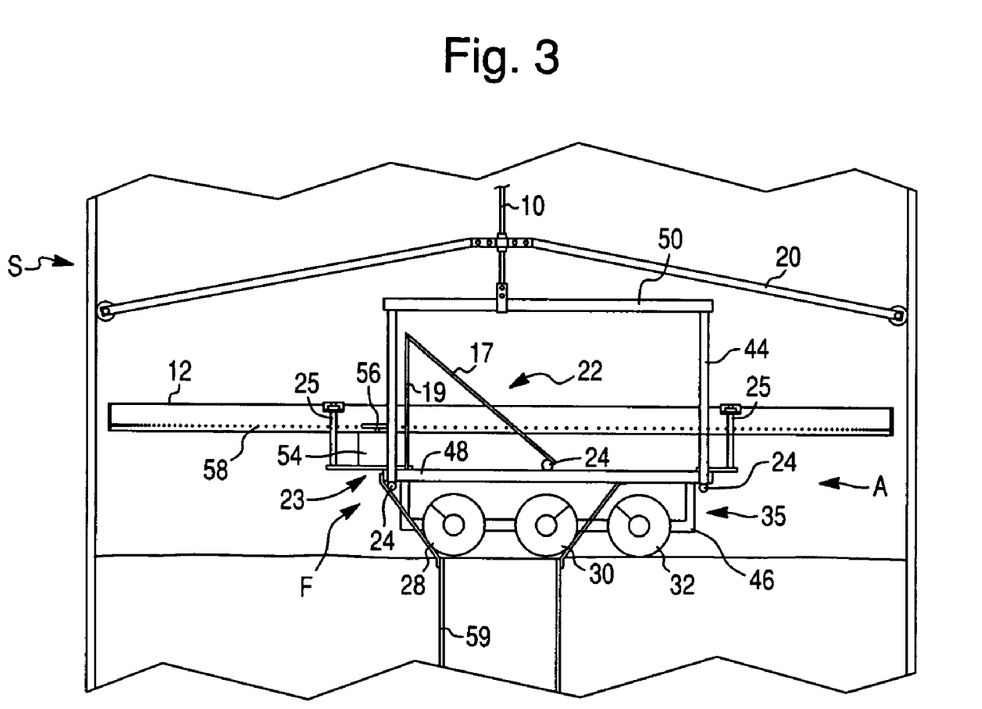
FIG. 3 is a fragmentary elevational view taken along the line 3—3 in FIG. 2 and viewed in the direction of the arrows.

Upper auger support system 23, as best shown in FIGS. 2 and 3, includes at least two elongate members 24 that extend from the first end 8 of the auger assembly A to the second end 14 of the auger assembly A. Multiple upper cross members 26 extend across and are secured to the elongated members 24. The cross members include at least an inner cross member 27, an outer cross member 31, and a centerline cross member 33. The centerline cross member 33 extends across the elongated members 24 in the approximate area where the silo centerline intersects the auger assembly A when the auger assembly A is in the normal operating position, as best shown in FIG. 1. The elongated members 24 and the cross members 26, 27, 31, and 33 form the upper auger support system 23.

Lower auger support carriage 35, as best shown in FIGS. 2 and 3, extends below the upper auger support system 23. The lower auger support carriage 35 is comprised of at least a gearing support member 29 at the first end 8 of the auger assembly A, and an outer auger support member 46 at the second end 14 of the auger assembly A. The outer auger support member 46 is positioned beneath the outer support cross member 31. The combination of the lower auger support carriage 35 and the upper auger support system 23 comprises the frame assembly F.

The auger assembly A includes first 28, second 30, and third 32 individual augers as best shown in FIGS. 2, 3, 5, and 6. The first 28 and third 32 augers have the same flighting. The second auger 30 has flighting that is different from the first 28 and third 32 augers, preferably opposite of the first 28 and third 32 augers. In the preferred embodiment, the first 28 and third 32 augers have left-hand flighting and the second auger 30 has right-hand flighting. In the preferred embodiment, the augers 28, 30, 32 are equally spaced, extend parallel to one another on the same horizontal plane, and rotate on parallel axes.

Alternative auger configurations should be considered within the scope of the invention. The relative diameters, spacing, and length of the first 28, second 30, and third 32 augers may be modified. For example, the second auger 30 may be modified to have a significantly larger diameter than the first 28 and third 32 augers to enhance the effect of the second auger 30 relative to the first 28 and third 32 augers. Similarly, the augers need not be disposed on the same plane, or they may be disposed along a non-horizontal plane.

A first reversible motor 36, as best shown in FIG. 2, preferably positioned on the inner cross member 27, powers first 38, second 40, and third 42 gearboxes, preferably positioned on the gearing member 29. A speed reducer 21 transfers power from the first reversible motor 36 to a power transmission shaft within the gearing support member 29. The power transmission shaft transfers power to the first 38, second 40, and third 42 gearboxes. The first 38 and third 42 gearboxes are right-angle gearboxes, and the second gear box 40 is a three-way gearbox. The first 38, second 40, and third 42 gearboxes then power the first 28, second 30, and third 32 augers respectively.

Alternate gearing and power transmission arrangements should be considered within the scope of the invention. For example, in an alternative embodiment, an optional clutch assembly 37 prevents the first reversible motor 36 from powering the third gearbox 42 and the third auger 32 during unloading operations, so that all available power is directed to the first 28 and second 30 augers. Additionally, multiple motors may drive the gear boxes 38, 40, 42, or the gearboxes 38, 40, 42 may be combined into one or two gearing assemblies.

As best shown in FIGS. 2 and 3, the second end 14 of the auger assembly A is rotatably connected to a stationary ring assembly 12 through a gearing mechanism 56, 58. A second reversible motor 54 is preferably positioned on the outer cross member 31 to provide power to the gearing mechanism 56, 58 at the second end 14 of the auger assembly A. Specifically, the second reversible motor 54 powers a perimeter gearing assembly 56 that meshes with a gear track 58 on the ring assembly 12. The auger assembly A pivots as the perimeter gearing assembly 56 moves about the gear track 58 on the ring assembly 12. The ring assembly 12 also vertically supports the second end 14 of the auger assembly A through at least two rolling and/or sliding supports 25 which move as the gearing mechanism 56, 58 moves the second end 14 of the auger assembly A around the ring assembly 12. A spacing assembly 39 prevents the ring assembly 12 from contacting the inner wall of the silo S.

As best shown in FIGS. 2 and 3, the first end 8 of the frame assembly F is supported vertically by attachment of a suspension box 44 to the frame assembly F. The suspension box 44 lower member 48 is attached to the frame assembly F adjacent to the centerline cross member 33. The stem assembly 10 is attached to the suspension box 44 upper member 50. As best shown in FIG. 1, the stem assembly 10 is attached to a support cable that maintains the auger assembly A suspended within the silo S. The second end 14 of the auger assembly A is supported vertically by the attachment of a support cable to the ring assembly 12. As described above, the ring assembly 12 is rotatably attached to the second end 14 of the auger assembly A.

As best shown in FIG. 3, a center hole mechanism 59 is suspended below the auger assembly A. During the loading process the center hole mechanism 59 ensures that a center hole 3 is formed in the stored silage. During the unloading process, the center hole mechanism 59 ensures that the top of the center hole 3 remains unobstructed. The current invention is designed to function with most center hole forming or maintenance mechanisms known in the art.

As best shown in FIGS. 1–3, 4, and 5, a diverter assembly 22 is disposed above frame assembly F. The diverter assembly 22 is comprised of a center hole shelter 15 (not shown in FIG. 3), a deflector panel 17, and a diverter support member 19, as best shown in FIGS. 3 and 4. The diverter assembly 22 extends at least partially over the auger assembly A and prevents incoming silage 7 from being deposited in the center hole 3, and deflects the incoming silage 7 to an area between the second 30 and third 32 augers, as best shown in FIG. 6.

Figure 5:
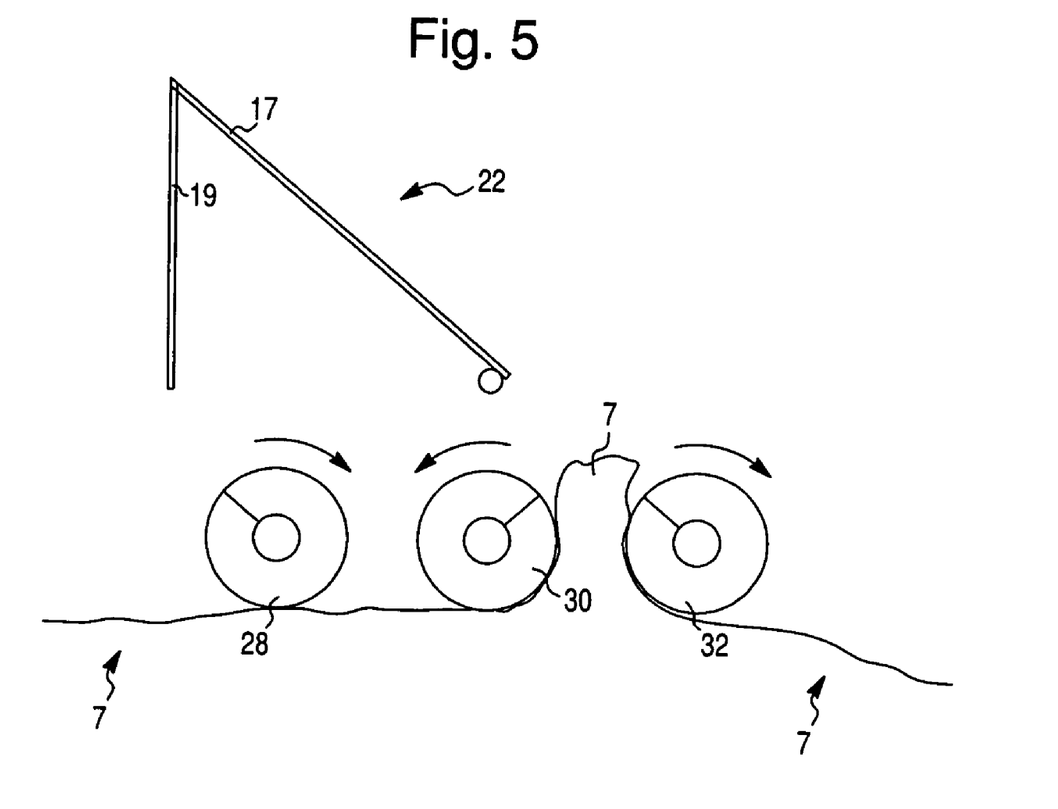
FIG. 5 is an elevational view of the auger assembly as viewed from the center of the silo during a silo-loading (filling) operation.

As best shown in FIGS. 1 and 5, during a loading (silo-filling) operation, silage 7 is directed into the silo S through a conventional loading mechanism 5, as best shown in FIG. 1. As best shown in FIG. 5, the diverter assembly 22 deflects silage to an area between the second 30 and third 32 augers. The rotation of the second 30 and third 32 augers lifts the silage upwardly and moves the silage 7 radially away from the center 3 of the silo S and toward the silo S inner wall. The first auger 28 also functions to move the silage outwardly. The direction of the rotation of the individual augers 28, 30, 32, is best shown by the arrows in FIG. 5.

Simultaneously, the second reversible motor 54 applies a force to the second end 14 of the auger assembly A and causes the auger assembly A to rotate about the center line of the silo S. The auger assembly A consequently sweeps an essentially horizontal cross section of the silo S in a clock hand-type manner. The combination of the rotation of the individual augers 28, 30, 32 and the sweeping action of the auger assembly A moves the silage 7 radially outward and ensures that the silage 7 filling the silo S is evenly distributed across a cross section of the silo S.

Figure 6:
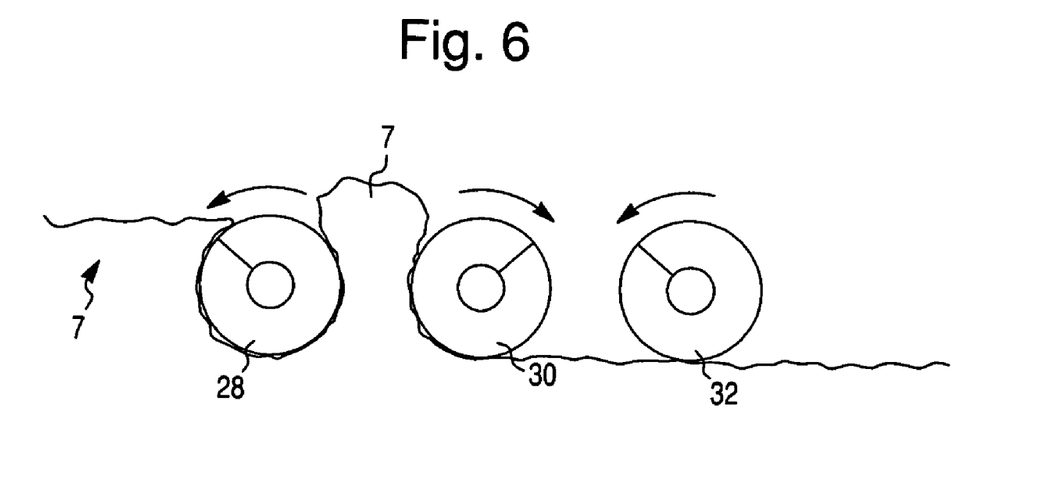
FIG. 6 is an elevational view of the auger assembly as viewed from the center of a silo during a silo-unloading operation.

As best shown in FIGS. 1 and 6, during an unloading (silo-emptying) operation, the direction of rotation of the individual augers 28, 30, 32 is reversed through actuation of a pushbutton or like motor controller communicating with motor 36 so that silage is moved radially inward from the outer areas of the silo S toward the silo center hole 3. As described above, the auger assembly A is also moved in a sweeping action during the unloading process. The direction of the auger assembly A sweeping action during the unloading process may be the opposite of the direction during the loading process. Through the rotary action of individual augers 28, 30, 32, and the sweeping movement of the auger assembly A, silage 7 is transported radially inward from the outer areas of the silo to a hole 3 in the center of the stored silage 7.

During the unloading process, the first 28 and second 30 augers cooperate to lift the silage upwardly and move the silage 7 radially inward, while the third auger 32 also functions to move the silage 7 inward. The direction of rotation of the individual augers 28, 30, 32 during the unloading process is best shown in FIG. 6. As the silage 7 is transported inwardly, it is directed toward and through the center hole 3, and then down to a discharge apparatus 9 at the base of the silo S. The discharge apparatus 9 discharges the silage 7 from the silo S.

As best illustrated in FIGS. 5 and 6, no mechanical changes in the auger assembly A are required to go from a loading to an unloading configuration. To change the function of the auger system, the auger system operator simply reverses the direction of rotation of the individual augers 28, 30, 32.

Figure 7:
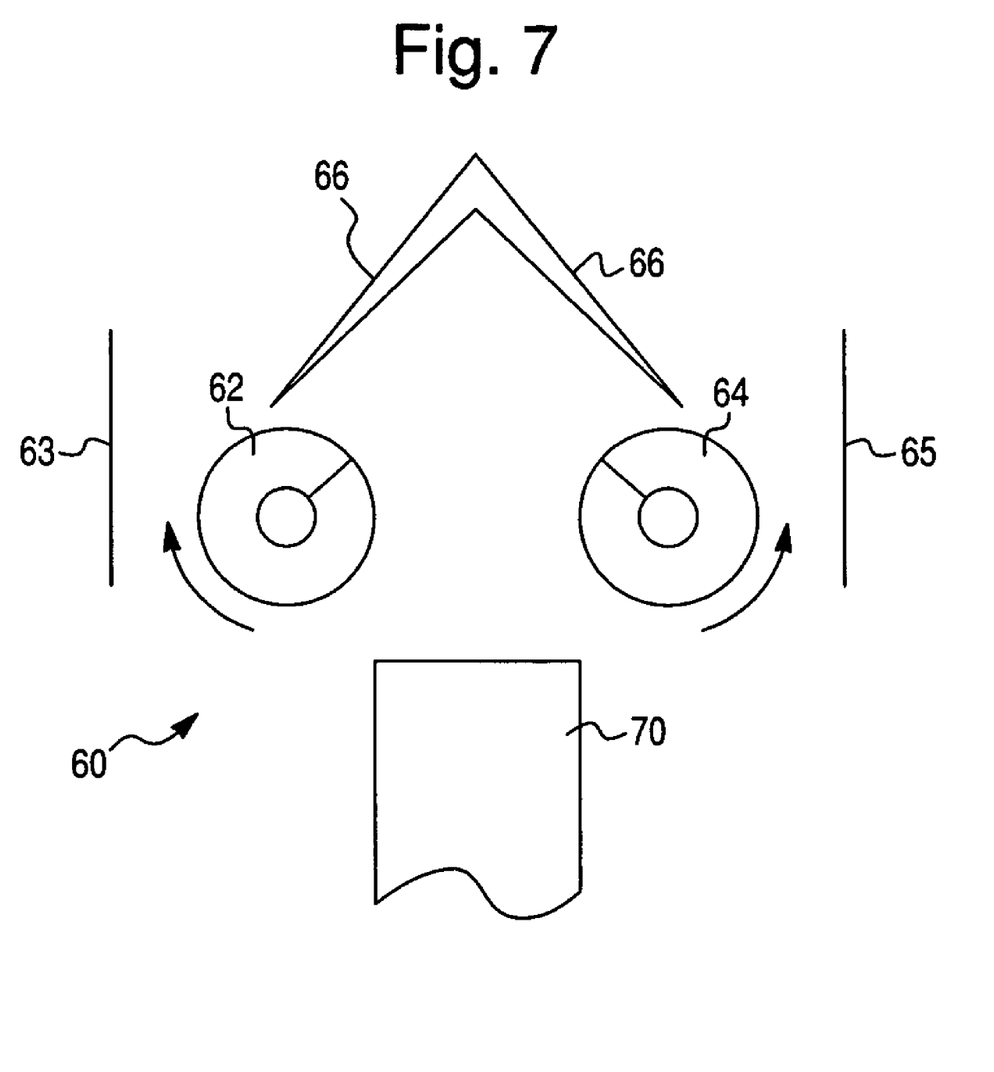
FIG. 7 is an elevational view of an alternative embodiment comprising two augers and two associated banking boards.

As best illustrated in FIG. 7, an alternative two-auger system also allows an operator to transition from a loading to an unloading configuration without mechanically changing the auger assembly. In the FIG. 7 alternative embodiment, the auger assembly 60 is comprised of a first auger 62, a second auger 64, a first banking board 63, and a second banking board 65. The first 62 and second 64 augers have opposite flighting and rotate in opposite directions. During the silo loading process, a diverter assembly 66 ensures that silage 7 is deposited between the first auger 62, and the first banking board 63, and also between the second auger 64 and the second banking board 65. The augers 62, 64 rotate so that silage 7 is directed against the banking boards 63, 65, and moves radially outward along the longitudinal axes of the augers 62, 64 and the banking boards 63, 65.

The two-auger embodiment shown in FIG. 7 uses the banking boards to direct the silage only during the silo loading (silo-filling) process. During the unloading process, the augers 62, 64 cooperate in a manner similar to a conventional two-auger system to move the silage 7 inwardly toward the center hole mechanism 70.

For the foregoing reasons it is clear that the preferred embodiment of the present invention provides an improved method and apparatus for transporting silage within a silo during the silo loading or unloading process. The present invention transports silage as quickly as a conventional prior art dual auger system, however, unlike the dual auger systems, the present invention also allows an operator to transition from a loading configuration to an unloading configuration by simply reversing the rotation direction of the augers.

Although the storage container primarily described above is a silo and the material transported within the storage container is silage, other types of storage containers and materials should be considered within the scope of the invention. Similarly, although the drawings disclose an auger assembly having three augers, it should be understood that additional augers may be added to the auger assembly. Although the materials of construction are not described, they may include a variety of compositions consistent with the function of the invention.

Variations of the gearing and mechanical support structure should also be considered within the scope of the invention. Such variations are not to be regarded as a departure from the spirit and scope of the invention, and all such modifications as would be obvious to one skilled in the art are intended to be included within the scope of the following claims.

What is claimed:

1. A system for transporting silage within a silo, said system comprising:
    an auger assembly comprising first, second, and third augers having longitudinal axes adapted to be positioned essentially parallel to one another,
    said first and third augers having essentially the same flighting and rotating in a first direction, and
    said second auger being positioned between said first and third augers and having flighting opposite from said first and third augers and rotating in an opposite direction from said first and third augers,
    wherein said first, second, and third augers cooperate to transport silage during one of a silo loading or unloading process; and
    a diverter assembly positioned above said first, second, and third augers, wherein said diverter assembly is positioned over said first and said second augers so that said silage entering said storage container from above is directed between said second and said third augers thereby allowing said second and said third augers to spread said silage.

2. The system as described in claim 1 wherein said system is converted from a loading to an unloading configuration by reversing a direction of rotation of said first, second, and third augers without mechanically modifying said auger assembly.

3. The system of claim 1 wherein said augers are positioned on a common horizontal plane.

4. The system of claim 1 wherein said augers are equally spaced apart.

5. The system as described in claim 1 wherein said auger assembly has a first end and a second end, said first end being positioned in a center portion of said silo and said second end being positioned adjacent to an inner surface of said silo.

6. The system as described in claim 5 further comprising:
    a stem assembly supporting said auger assembly first end,
    a non-rotatable ring assembly supporting said auger assembly second,
    a reversible perimeter motor operably associated with said auger assembly second end, wherein said reversible perimeter motor applies force to said auger assembly second end thereby causing said auger assembly to pivot about said stem assembly and allowing said auger assembly to sweep an essentially horizontal cross section of said silo.

7. The system as described in claim 6 further comprising a hoisting assembly including:
   a winch positioned outside said silo,
   a support cable assembly connected to said winch,
   a suspension assembly, said support cable assembly extending upward through said suspension assembly and downward into said silo interior, said support cable assembly connecting to said non-rotatable ring assembly and to said stem assembly,
   a spider frame assembly connected to said stem assembly and extending outwardly to said silo inner walls so that said stem assembly is centered within said silo,
   wherein said auger assembly is raised and lowered by the operation of said winch through said support cable assembly connection with said stem assembly and said non-rotatable ring assembly.

8. The system described in claim 1 further comprising a hole mechanism extending below said auger assembly to create a hole in said stored silage and to ensure that said hole is not obstructed.

9. An apparatus for transporting silage comprising:
   a silo,
   an auger assembly including first, second, and third augers extending in parallel, said second auger positioned between said first and said third augers, said first auger having essentially a same flighting as said third auger, said first auger rotating in a same direction as said third auger, and said second auger having a different flighting and rotating in a different direction than said first and third augers,
   a frame assembly for supporting said auger assembly, said frame assembly including an upper auger support system comprising,
      a suspension box having an upper member and a lower member, said upper member having an attachment to said suspension system,
      elongated members attached to said suspension box, said elongated members extending perpendicularly from said suspension box outwardly to an inner wall of said silo, said elongated members including at least first and second elongated members,
      cross members extending from said first elongated member to said second elongated member, said cross members including at least:
         an inner cross member positioned at a first distal end of said auger assembly,
         an outer cross member positioned adjacent said silo inner wall at a second distal end of said auger assembly, and
      a suspension system suspending said auger assembly and said frame assembly within said silo and thereby enabling said auger assembly to be raised and lowered to facilitate one of loading and unloading said silo.

10. The apparatus of claim 9, wherein said augers are equally spaced apart.

11. The apparatus of claim 10, wherein said augers lie on a common plane.

12. The apparatus of claim 9, wherein said frame assembly further includes a lower auger support carriage, comprising:
   a gearing member positioned between said inner and said outer cross members,
   an outer auger support member positioned adjacent said silo inner wall below said outer cross member,
   wherein said lower auger support carriage comprises a lower portion of said frame assembly, said first, second, and third augers being supported within said frame assembly.

13. The apparatus of claim 12, further comprising:
   at least one reversible auger motor operably associated with said auger assembly,
   a gearing assembly positioned on said gearing member, said gearing assembly including at least a first gearing mechanism connected to said first auger, a second gearing mechanism connected to said second auger, and a third gearing mechanism connected to said third auger,
   wherein said auger motor provides power to said first, second, and third gearing mechanisms thereby powering said first, second, and third augers and allowing said first, second, and third augers to move said silage within said silo.

14. The apparatus of claim 13 further comprising:
   a non-rotatable ring assembly supporting said auger assembly second distal end,
   a second reversible motor operably associated with said auger assembly,
   wherein said second reversible motor applies a force to said second distal end of said auger assembly thereby causing said auger assembly to rotate about a centerline of said silo.

15. The apparatus of claim 14 wherein a center hole mechanism extends downwardly from said frame assembly to ensure that a center hole is formed in said stored silage during a loading process and to provide a conduit for discharging silage during an unloading process.

16. The apparatus as described in claim 15 further comprising a diverter assembly wherein said diverter assembly comprises at least one planar member positioned above said auger assembly for diverting said silage away from said center hole to an area between two of said three augers.

17. The apparatus described in claim 16 wherein said suspension system comprises:
   a winch positioned on an exterior of said silo,
   a support cable system connected to said winch,
   a suspension assembly, said support cable system extending upwardly into a top of said silo and downwardly through said suspension assembly,
   a stem assembly connected to said support cable system,
   a spider frame assembly connected to said stem assembly, said spider frame assembly ensuring that said stem assembly is centered in said silo,
   wherein said winch acting through said support cable system, said suspension assembly, and said stem assembly allows said auger assembly to be raised and lowered.

18. A method of transporting silage during a silo loading process comprising:
   providing an auger assembly within the silo, said auger assembly having at least three augers,
   inserting silage through a top of the silo,
   diverting the silage to an area between two of the augers so that the augers move the silage outwardly from a centerline of the silo, sweeping the auger assembly in an essentially horizontal plane by rotating the auger assembly about the silo center line so that the silage is distributed across the silo cross section, raising the auger assembly as a height of silage within the silo is raised until the silo is filled to a desired height preparing the auger assembly to unload the silage loaded in the silo by reversing the direction of rotation of the at least three augers without mechanically modifying the auger assembly.

* * * * *